United States Patent [19]
Kirk

[11] 3,983,031
[45] Sept. 28, 1976

[54] METHODS AND APPARATUS FOR CONTROLLING THE SUPPLY OF A FEED GAS TO DISSOLUTION DEVICES

[75] Inventor: Bradley S. Kirk, North Plainfield, N.J.

[73] Assignee: Airco, Inc., Montvale, N.J.

[22] Filed: Apr. 2, 1975

[21] Appl. No.: 564,528

[52] U.S. Cl. ............................. 210/15; 210/63 R; 210/96 R; 210/104; 210/219; 210/220
[51] Int. Cl.² ..................... C02C 5/04; C02B 3/08
[58] Field of Search ........... 55/192; 209/170; 210/7, 210/14, 15, 63, 96, 104, 195 M, 218, 219, 220

[56] References Cited
UNITED STATES PATENTS

| | | | |
|---|---|---|---|
| 1,732,893 | 10/1929 | Hunt | 209/170 |
| 2,125,722 | 8/1938 | Hawkins | 210/96 X |
| 3,333,695 | 8/1967 | Van Note | 210/96 X |
| 3,342,727 | 9/1967 | Bringle | 210/96 X |
| 3,503,593 | 3/1970 | Nelson | 261/36 R X |
| 3,547,811 | 12/1970 | McWhirter | 210/7 |
| 3,713,274 | 1/1973 | Sauer et al. | 55/192 X |
| 3,724,667 | 4/1973 | McKinney | 210/7 X |
| 3,733,264 | 5/1973 | Spector et al. | 210/7 |
| 3,872,003 | 3/1975 | Walker | 210/96 X |

*Primary Examiner*—Charles N. Hart
*Assistant Examiner*—Robert H. Spitzer
*Attorney, Agent, or Firm*—David L. Rae; Edmund W. Bopp; H. Hume Mathews

[57] ABSTRACT

The supply of a gas to be dissolved in a liquid is controlled by initially sensing the concentration of dissolved gas in the liquid under treatment and subsequently producing appropriate control signals for adjusting the setting of a valve in the gas supply line. A dissolution device emplaceable in the liquid under treatment includes a liquid inlet and outlet and a static liquid-gas mixing means therebetween. The device is adapted to receive supplied gas whereby a gas space in the upper reaches of the device is established. The gas space is also maintained in communication with a dip tube disposed exteriorly of the device in the body of liquid with the lower extremity of the dip tube establishing the maximum height of the gas space within the dissolution device. The static mixing means comprises a gravitational fall device such that upon detecting an increase or decrease in the concentration of gas dissolved in the body of liquid, the supply of gas to the fall zone is reduced or increases, respectively, thereby decreasing or increasing the rate of gas dissolution. Upon reducing the supply of gas the electrical power necessary to pump liquid through the dissolution device is also conserved. In this manner, the supply of gas is correlated to the demand of the liquid therefor and wastage of electrical power necessary to effect the gas-liquid mixing within the dissolution device is substantially avoided.

7 Claims, 2 Drawing Figures

METHODS AND APPARATUS FOR CONTROLLING THE SUPPLY OF A FEED GAS TO DISSOLUTION DEVICES

BACKGROUND OF THE INVENTION

The present invention relates to methods and apparatus for controlling the dissolution of a gas in a liquid and more particularly methods and apparatus for automatically controlling the supply of a feed gas, the rate of dissolution and power required in accordance with the gas demand of the liquid.

In numerous instances, it is necessary to effect the dissolution of a gas in a liquid. Many times, the only constraint upon methods and apparatus for dissolving gases in a liquid is the electrical or other power required for generating mixing energy necessary to effect the required mass transfer. This is the case, for example, in the course of air aeration of mixed liquor in the secondary stage of an activated sludge process. However, in numerous other processes, the gas to be dissolved in a liquid is costly and therefore must be utilized efficiently to render such processes economical. For example, in the activated sludge waste treatment process, it has been found that secondary stage BOD reductions can be accomplished in a much shorter time and consequently the throughput of any system can be dramatically increased by utilizing a gas such as commercially pure oxygen in the treatment of mixed liquor. However, the requirement to conserve costly gases places an added constraint upon dissolution systems above and beyond the necessity to utilize electrical power as efficiently as possible.

In many processes, such as for example the activated sludge waste treatment process, both the demand of the liquid to be treated and the flow rate of such liquid tend to vary randomly and significantly over periods of time. Consequently, the loading, (which may be defined as the demand exhibited by a liquid for a particular gas) of mixed liquor in a secondary stage activated sludge process will vary widely at different times of the day. Consequently, in an "oxygen" wastewater treatment system, the oxygen flow to the particular dissolution device utilized must be carefully controlled in accordance with such variable loadings and flow rates. In a typical prior art system for dissolving oxygen in mixed liquor, as for example illustrated in U.S. Pat. No. 3,547,815, a simple control valve is utilized as a means for controlling the supply of feed oxygen to a dissolution device which is essentially comprised of a submerged sparger and rotating impeller in a covered aeration basin. Generally such impellers are driven at a predetermined rate to enable dissolution of oxygen at a rate sufficient to meet a particular $O_2$ demand at the mixed liquor. However, in the event that the loading of mixed liquor to be oxygenated substantially decreases, excessive electrical energy is utilized to continue driving such impellers at the predetermined rate. Accordingly, such dissolution devices are exemplary of prior art systems which have not been fully effective in simultaneously controlling gas utilization and electrical power necessary to effect the desired mass transfer of gas into the liquid under treatment.

In a further dissolution system such as the apparatus described in U.S. Pat. No. 3,826,742 and which is assigned to the assignee of the present invention, a gas to be dissolved is injected into liquid flowing through an enclosure and as such liquid undergoes a gravitational fall, the aforementioned gas is dissolved therein. The height of the gravitational fall is detected and related to the consumption of gas by the liquid such that upon the fall height decreasing, a valve in the gas feed line is controlled to augment the gas supply and thereby reestablish a predetermined fall height. While this apparatus is particularly suitable for the treatment of liquids such as mixed liquor of a secondary stage activated sludge process, in an elongated enclosure or pipeline, this apparatus is not well suited toward improving operation of conventional open tank secondary stage aeration systems. Consequently, prior art gas dissolution methods and apparatus reflect a clear need for techniques for efficiently utilizing and consuming an oxygen enriched feed, while additionally controlling the rate of dissolution in accordance with the loading of a liquid and thus enable reductions in electrical power particularly upon occurrence of significant reductions in such loading.

OBJECTS OF THE INVENTION

Accordingly, it is an object of the present invention to provide methods and apparatus for dissolving a gas in a liquid.

It is a further object of the present invention to provide methods and apparatus for controlling the supply of gas to a dissolution device in accordance with the gas demand exhibited by a liquid under treatment.

Another object of the present invention is to provide methods and apparatus for controlling the rate of dissolution of a gas in a liquid in accordance with the supply of such gas and the gas demand of a liquid under treatment.

It is still a further object of the present invention to provide methods and apparatus for efficiently dissolving gas in a liquid by reducing electrical power necessary for gas-liquid mixing energy in response to reductions in the gas demand exhibited by the liquid.

It is yet another object of the present invention to provide methods and apparatus for automatically controlling the gas supplied to a dissolution device, the rate of dissolution and the expenditure of electrical power in periods when a liquid under treatment exhibits a low gas demand.

It is still another object of the present invention to provide methods and apparatus for efficiently oxygenating mixed liquor in a secondary stage activated sludge waste treatment process.

Other objects of the present invention will become apparent from the detailed description of an exemplary embodiment thereof which follows and the novel features of the present invention will be particularly pointed out in conjunction with the claims appended hereto.

SUMMARY

In accordance with the present invention, apparatus for controlling the supply of a gas to be dissolved in a liquid comprises a chamber emplaceable in a body of said liquid and having inlet, outlet and static gas-liquid mixing means intermediate said inlet and outlet. A gas supply is connected to the chamber such that the pressure of supplied gas is effective to depress liquid in the chamber to a predetermined level corresponding to such pressure. Externally of the chamber in the body of liquid are disposed means for sensing the concentration of dissolved gas in the body of liquid and means communicating with the gas space of the chamber for limiting the extent to which liquid within the chamber is depressed. In addition, control means responsive to the dissolved gas concentration sensing means are provided for controlling the supply of gas to the chamber in response to sensed dissolved gas concentrations.

In accordance with a further aspect of the present invention, a method of controlling the supply of gas to be dissolved in a liquid comprises supplying such gas to a chamber emplaceable within a body of liquid to be treated thereby forming a gas space in the upper reaches of such chamber, subjecting liquid to be treated to a gravitational fall through such gas space and discharging liquid, with gas dissolved therein, from the chamber sensing the concentration of gas dissolved in the body of liquid, controlling the supply of such gas to the enclosure in response to sensed concentrations, and limiting the height of the gravitational fall of liquid in the enclosure by bubbling gas from said gas space through a dip tube disposed externally to the chamber upon the gas pressure within the enclosure exceeding a predetermined value. In addition, upon the gas demand of the liquid under treatment decreasing substantially, the supply of gas to the enclosure is correspondingly reduced as is the rate of dissolution of gas in liquid at the gravitational fall zone thereby enabling a reduction of power required to pump liquid through such zone. Thus, the present invention enables a careful control over the utilization of a gas to be dissolved in a liquid as well as a reduction of electrical power necessary to achieve sufficient gas-liquid mixing upon the gas demand of the liquid substantially decreasing.

Preferably, methods and apparatus according to the present invention are directed to the oxygenation of mixed liquor in a secondary stage activated sludge waste treatment process. In addition, a static mixing means in the form of a gravitational fall gas dissolution device is preferred in order to efficiently effect the mass transfer of a gas such as oxygen into the liquid such as mixed liquor. By adjustably positioning the lower end of the dip tube in the body of liquid, the maximum gas pressure within the chamber, and hence maximum gravitational fall height will be defined.

In a further embodiment of the present invention, a plurality of gas dissolution devices, such as chambers incorporating therein a gravitational fall type gas-liquid static mixing means may be provided. In this embodiment, a gas such as oxygen is supplied to a first chamber thereby establishing a gas space therein which is placed in communication through suitable conduits to a succeeding chamber. The gas pressure established in the first chamber will be effective to establish a similar gas space in the succeeding chambers and the maximum fall height of all chambers will be defined by means of a dip tube disposed in communication with the gas space of the last chamber. Similarly, the dissolved gas concentration of the liquid under treatment may be sensed to enable appropriate control of gas supplied to the first enclosure. The discharge of liquid with gas dissolved therein from each enclosure will preferably be through a nozzle or other discharge means such that the velocity of discharged wastewater will be sufficient to stir the body of liquid so as to maintain solids suspended therein.

BRIEF DESCRIPTION OF THE DRAWING

The invention will be more clearly understood by reference to the following detailed description of an exemplary embodiment thereof in conjunction with the following drawing in which.

DESCRIPTION OF THE PREFERRED EMBODIMENTS

Figure 1:
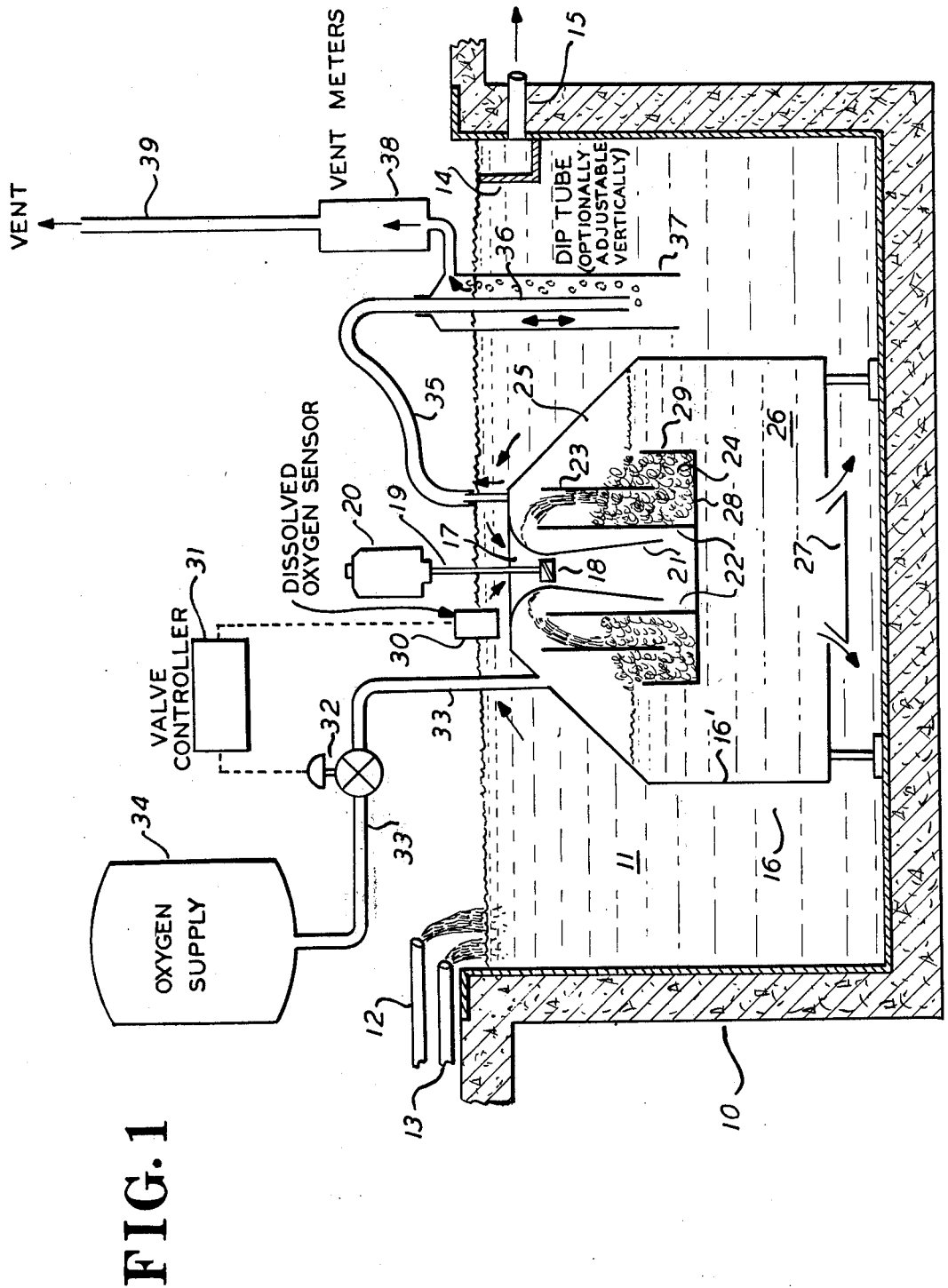
FIG. 1 is a plan view of an exemplary embodiment of a gas dissolution device provided with a gas supply control system in accordance with the present invention.

Referring now to FIG. 1, illustrated therein is an exemplary embodiment of gas dissolution apparatus as well as a system for controlling the supply of gas to such apparatus which is generally comprised of a tank 10 for containing a body of liquid 11 to be treated, gas dissolution device 16, gas supply control means 30, 31, 32 and dip tube means 36, 37, for limiting the volume of gas established within dissolution device 16. More particularly, tank 10 is suitably constructed to retain a predetermined volume of liquid 11 under treatment which liquid preferably comprises secondary mixed liquor of an activated sludge waste treatment system. However, although such mixed liquor is preferably oxygenated within tank 10 in accordance with the present invention, it will be recognized that other liquids may be treated with other gases. For example, neutralizing agents such as carbon dioxide and ammonia may be utilized to adjust the pH of an aqueous solution, or, the black liquor effluent from a pulping process may also be oxygenated. For purposes of convenience, and only for such purposes, the present invention will now be described in connection with the oxygenation of secondary mixed liquor as heretofore mentioned. Accordingly, a conduit 12 is suitably disposed to admit either raw waste or primary effluent into tank 10. In addition, a suitable conduit 13 is also provided for the purpose of recycling activated sludge to tank 10 in known manner. A suitable outlet device in the form of a weir 14 and conduit 15 are preferably provided for enabling the discharge of oxygenated mixed liquor from tank 10 for eventual clarification and tertiary treatment. However, as the latter treatment steps are outside the scope of the present invention, further description thereof is deemed unnecessary.

Dissolution device 16 is preferably comprised of a generally enclosed chamber 16' emplaceable within body of mixed liquid 11 and includes a liquid inlet 17 disposed at an upper surface thereof. A suitable impeller 18 mounted on a shaft 19 which in turn is driven by motor 20 are provided in known manner for drawing liquid within tank 10 through inlet 17 at a predetermined flow rate. Dissolution device 16 is also preferably provided with a static gas-liquid mixing device which may take the form of a gravitational fall means comprised of inlet conduit 21, partitions 22, 28 and 29 and baffle 23. Inlet conduit 21 is preferably disposed internally of vertical partitions or weirs 22 which essentially form a re-entrant well. Liquid pumped through conduit 21 is passed through the liquid flow space between the exterior of conduit 21 and partitions 22. By configuring inlet conduit 21 such that the lower extremity thereof defines a greater cross-sectional area than upper portions, a reduction in the velocity of pumped liquid will be achieved which in turn is beneficial in reducing friction losses as liquid proceeds downwardly through conduit 21 and then upwardly through the aforementioned flow space between conduit 21 and partitions 22.

Upon the introduction of a suitable oxygenating gas through conduit 33 into chamber 16', liquid therein will be depressed to a level corresponding to the pressure of supplied gas which may comprise commercially pure oxygen and preferably is comprised of at least 40% oxygen. Baffle 23 and partition 29 are preferably disposed substantially vertically and spaced from one another and partition 22 to define a gravitational fall zone 24 as depicted in FIG. 1. As a consequence of the pumped mixed liquor stream flowing over the upper edge of partition 22 through gas space 25 and impinging upon the surface of liquid 26, a high degree of liquid-gas turbulence is generated within fall zone 24 which in turn is effective to promote a rapid mass transfer of oxygen into mixed liquor. As the oxygenated mixed liquor flows away from gravitational fall zone 24 over the upper edge of partition 29 and into liquid accumulation space 26, bubbles of undissolved oxygenating gas entrained in the mixed liquid stream undergoing the gravitational fall will be disentrained into gas space 25 and may be returned to the upper reaches of fall zone 24 through the opening above the upper edge of baffle 23. Consequently, the velocity of oxygenated mixed liquor emanating from gravitational fall zone 24 is reduced in liquid accumulation space 26 as the aforementioned undissolved oxygenating gas bubbles are disentrained therefrom. By providing a nozzle 27, which may comprise a nozzle as illustrated in U.S. Pat. No. 3,933,640 and which is assigned to the assignee of the present invention, oxygenated mixed liquor will be discharged from chamber 16' at an increased velocity along the general direction of arrows illustrated in FIG. 1. The aforedescribed discharge of oxygenated mixed liquor enables a high and efficient degree of stirring mixed liquor 11 and thus maintains organic solids suspended therein, which of course is necessary to sustain a high level of microbial activity.

In accordance with the present invention, means for limiting the maximum gravitational fall height of liquid within chamber 16' are generally comprised of conduit 35, dip tube 36, enclosure 37, vent meters 38 and vent conduit 39. Conduit 35 is preferably disposed in communication between the upper reaches of chamber 16' and the upper end of dip tube 36 which is preferably sealed to an enclosure 37 and which is disposed exteriorly of chamber 16' in mixed liquor 11. Enclosure 37 is disposed by any suitable means in communication with vent meters 38 which are effective to measure the volume of a gas flow therethrough and are coupled through conduit 39 for venting such a gas flow to atmosphere. Dip tube 36 may, of course, be vertically adjustable within enclosure 37 and it will be appreciated that such gas pressure is limited to the liquid head existing between the lower extremity of dip tube 36 and the surface of mixed liquor 11. Consequently, such limitation on gas pressure within enclosure 16' also serves to limit the extent to which liquid within chamber 16' is depressed and consequently defines the maximum fall height of liquid pumped over partition or weir 22 into fall zone 24. Therefore, any increase in the gas pressure within chamber 16' beyond the maximum pressure defined by dip tube 36, will only result in the passage of oxygenating gas from space 25 through conduit 35 and dip tube 36. The bubbled gas may be collected in the upper reaches of enclosure 37, which preferably extend above the surface of mixed liquor 11 and then passed through vent meters 39 to atmosphere.

In addition to the aforedescribed structure, the present invention includes a dissolved oxygen sensor 30, valve controller 31, valve 32 and oxygen supply 34. Dissolved oxygen sensor 30 may take the form of any conventional device capable of detecting oxygen concentration in parts per million in a liquid and supplying an output signal representative of such detected concentrations. A valve controller 31 is connected to receive an output generated by dissolved oxygen sensor 30 and may comprise a known proportional reset control device and may, for example, take the form of a device commercially available from the G. W. Dahl Company, Inc., Bristol, Rhode Island. Oxygen supply 34 may comprise a vessel for storing a supply of gaseous oxygen or, supply 34 may conveniently comprise a liquid oxygen station which would, of course, include a liquid storage tank and a suitable vaporizer adapted to supply gaseous oxygen through conduit 33 and valve 32 to chamber 16'. Valve 32 preferably comprises a motorized valve well known to those skilled in the art. Preferably valve 32 is adapted to be driven by valve controller 31 preferably between a fully open and fully closed condition in dependence upon the oxygen demand exhibited by mixed liquor 11 and the rate at which oxygen is supplied to chamber 16'.

In order to facilitate a full understanding of the operation of sensor 30, controller 31 and valve 32, the following operation thereof will be illustrated. In order to assure a high level of microbial activity in mixed liquor 11, the dissolved oxygen (DO) concentration thereof is generally set or maintained at a predetermined value such as 5.0 mg/l. The actual DO level of mixed liquor 11 will, of course, vary with the waste supplied through conduit 12 to tank 10 and, for example, should the DO level of mixed liquor 11 decrease to 4.0 mg./l. (indicating a high oxygen demand of such mixed liquor) this latter actual concentration will be detected by sensor 30 and a signal representative thereof will be supplied as an input to controller 31 which is then effective to compare the actual and desired DO levels of mixed liquor 11. The results of this comparison will be reflected as a mechanical translation, the magnitude of which corresponds to the difference between the actual and predetermined DO levels as mentioned heretofore. Consequently, valve 32 is driven to a more open position thereby increasing the oxygen flow from supply 34 to chamber 16' which will be reflected as an increased DO level in mixed liquor 11.

Operation of the exemplary embodiment of apparatus in accordance with the present invention as illustrated in FIG. 1 will now be described. In essence, the aforedescribed apparatus is conditioned for operation in a normal or steady-state mode, operation under heavy loadings, and operation under relatively light loadings. In normal steady-state operation, valve 32 is set to enable a desired oxygen flow into chamber 16' while motor 20 is energized thereby pumping mixed liquor through inlet 17 and consequently delivering a mixer liquor stream into fall zone 24 at a predetermined flow rate. In the event that the oxygen supplied to chamber 16' is equal, or approximately equal to the oxygen demand of mixed liquor 11, oxygen supplied through conduit 33 will approximately equal the amount of oxygen dissolved in mixed liquor in gravitational fall zone 24. As this highly oxygenated mixed liquor is eventually discharged from liquid accumulation space 26 through nozzle 27 into tank 10, the DO level of mixed liquor 11 will be maintained at a substantially constant value. It will be understood, however, that during such operation, certain impurities or waste gases such as nitrogen will be stripped from mixed liquor 11 within chamber 16' and consequently, the oxygen concentration within gas accumulation space 25 will decrease. It has been found that when ordinary domestic waste comprises mixed liquor 11, and substantially pure oxygen is supplied through conduit 33 to chamber 16', the oxygen concentration in gas space 25 will decrease to approximately 50%. Furthermore, due to the entrainment of undissolved gas from space 25 into the turbulent liquid flow through gravitational fall zone 24, some gas will not be disentrained from mixed liquor within liquid accumulation space 26 and will be swept out of chamber 16' through nozzle 27. Such gas removal will constitute a sufficient venting of impurities, e.g. nitrogen, from chamber 16' that assuming a constant oxygen demand exhibited by mixed liquor 11, the aforedescribed oxygenation of mixed liquor will continue in steady state mode.

As a consequence of the loading or oxygen demand of influent waste varying widely over a given period of time, the condition in which a high or 'shock' loading is exhibited by mixed liquor 11 will not be considered. In the event that sensor 30 detects an extremely low DO level as a consequence of extremely high microbial activity consuming excessive or unexpectedly large quantities of dissolved oxygen, valve controller 31 and valve 32 will be effective as previously described to increase the oxygen flow from supply 34. This marked increase in oxygen flow will generate an increased pressure within gas space 25 of chamber 16' and consequently will depress the level of liquid in accumulation space 26. This depression of liquid within chamber 16' will correspondingly result in a greater height through which pumped mixed liquor will undergo a gravitational fall. The increased turbulence resulting from a gravitational fall of mixed liquor through a greater distance will correspondingly effect an increased mass transfer rate of oxygen into mixed liquor such that the DO level of oxygenated mixed liquor discharged from accumulation space 26 through nozzle 27 will increase. The aforementioned increased oxygen flow rate will be effective to establish a maximum fall height within chamber 16' as a consequence of conduit 35 and dip tube 36 being in communication with gas space 25. Thus, as the surface of liquid in accumulation space 26 is depressed to a level corresponding to the bottom of dip tube 36, the oxygenating gas within space 25 will begin to escape through the bottom of dip tube 36 and consequently will be collected in enclosure 37. At this point of operation, gas space 25 is effectively vented and a maximum flow rate of oxygen supplied to chamber 16' is established. It is noted, therefore, that the apparatus according to the present invention is particularly well adapted to enable sufficient oxygenation of mixed liquor to satisfy extremely heavy oxygen demands at the expense of reducing somewhat the oxygen utilization efficiency of the apparatus as a consequence of the aforementioned venting of gas from space 25.

In the event that the oxygen demand of mixed liquor 11 begins to decrease from a peak loading, the dissolved oxygen level thereof will increase, particularly during operation of the aforedescribed apparatus under maximal oxygen flow conditions. Consequently, upon sensing such an increase in the DO level by means of sensor 30, valve controller 31 and valve 32 are operable to decrease the oxygen flow to chamber 16' which in turn results in a lower pressure within gas space 25 and consequently a reduced gravitational fall height which pumped mixed liquor subsequently undergoes. Thus, the mass transfer rate of oxygen into mixed liquor is reduced and the resultant lower oxygen demand of mixed liquor 11 will be matched by a lessening of the oxygenation of mixed liquor pumped through chamber 16'. Accordingly, as the mixed liquor loading decreases from a peak condition to a normal or essentially constant condition, the oxygen demand thereof is balanced or matched by a correspondingly reduced rate of oxygenation occurring within chamber 16' until the aforementioned steady-state condition has been attained. It will be understood, however, that upon reducing the oxygen flow rate from a maximal value, the height of the gravitational fall of mixed liquor within chamber 16' is reduced and consequently the bubbling of oxygenating gas through dip tube 36 into enclosure 37 is terminated. Under this latter condition, a secondary degree of venting is achieved as a consequence of the entrainment of a minor portion of undissolved gas within the highly oxygenated mixed liquor in accumulation space 26 and the discharge of such liquor with gas bubbles entrained therein through nozzle 27.

During conditions of light loading, namely when the oxygen demand of mixed liquor 11 is below a predetermined value and consequently the DO level thereof exceeds a predetermined value, the apparatus according to the present invention will be operable to conserve both oxygen supplied to chamber 16' as well as electrical power. As a consequence of sensor 30 detecting a higher than desired DO level in mixed liquor 11, valve controller 31 and 32 are effective to decrease the oxygen flow to chamber 16'. This in turn has the effect of reducing the pressure within gas space 25 and consequently reducing the height of the gravitational fall of mixed liquor pumped through chamber 16'. Similarly, the rate of mass transfer of oxygen into mixed liquor, i.e. rate of oxygenation, is decreased and consequently, the DO level of oxygenated mixed liquor emitted from liquid accumulation space 26 through nozzle 27 is likewise reduced. In this manner, the overall DO level of mixed liquor 11 is reduced toward the aforementioned predetermined value. In addition, and very importantly, by reducing the height of the gravitational fall within chamber 16' as previously mentioned, the head against which impeller 17 must pump mixed liquor at a predetermined flow rate, is noticeably reduced and consequently, the electrical power required to pump such a flow rate is correspondingly diminished. Thus, during periods of light loading, apparatus in accordance with the present invention is effective to conserve both oxygen as well as electrical power which dual savings is not obtainable with prior art oxygenation systems.

Figure 2:
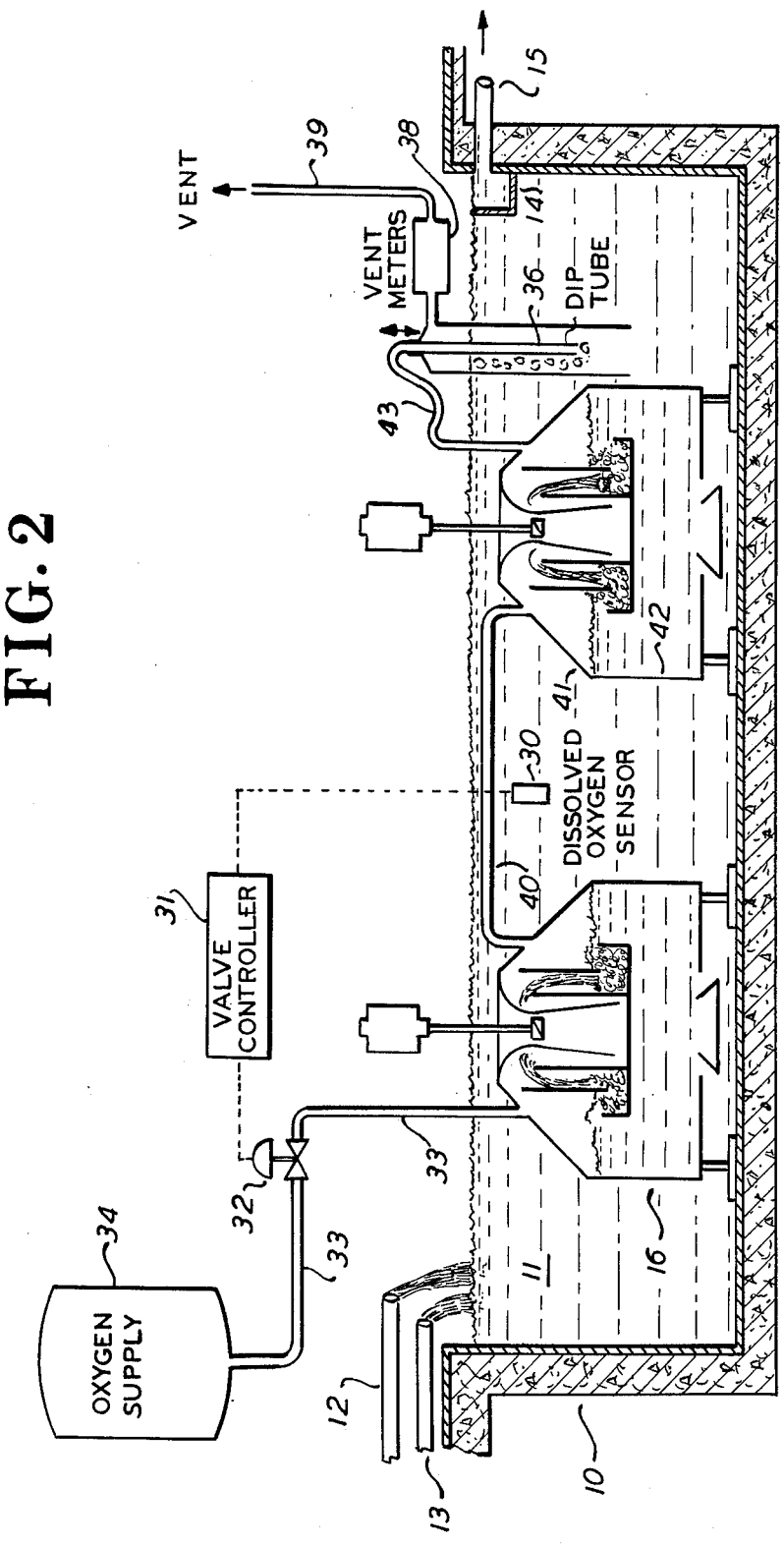
FIG. 2 is a plan view of an exemplary embodiment of a plurality of gas dissolution devices emplaced in a body of liquid to be treated together with a gas supply control system in accordance with the teachings of the present invention.

Referring now to FIG. 2, illustrated therein is a further exemplary embodiment for controlling the supply of oxygen to a plurality of dissolution devices. As a considerable portion of the structure illustrated in FIG. 2 is common to that previously described in connection with the apparatus illustrated in FIG. 1 primary attention will now be directed to the additional structure depicted in FIG. 2. A second dissolution device 41, which comprises an enclosure 42 and a gravitational fall type gas-liquid mixing means similar to dissolution device 16 is preferably emplaced in mixed liquor 11. A conduit 40 is disposed in communication between the gas space of device 16 and the upper reaches of dissolution device 41. In addition, a further conduit 43 is connected to communicate between the gas space formed in dissolution device 41 and dip tube 36.

The operation of the plurality of dissolution devices illustrated in FIG. 2 will be briefly described. Dissolution device 16 will operate in a manner substantially identical to that as previously described although the gas space thereof is coupled to the gas space of dissolution device 41 and is effective to depress liquid within device 41 to a level corresponding to the level of liquid within device 16 subject to minor frictional losses encountered by virtue of the gas flow through conduit 40. The gas space of device 41 is maintained in communication with dip tube 36 such that the gas pressure within spaces of dissolution devices 16 and 41 will be limited to the head of mixed liquor operating against dip tube 36. In the course of steady-state conditions, or light or heavy loading conditions, dissolution devices 16 and 41 will operate in a manner as previously described in connection with the operation of device 16 illustrated in FIG. 1. It will be appreciated, however, that by venting an oxygenating gas from dissolution device 16 to dissolution device 41, a greater overall oxygen utilization will be achievable in comparison with oxygenating a body of mixed liquor with a single dissolution device. Furthermore, although a pair of dissolution devices 16 and 41 are illustrated in FIG. 3, it will be understood that three or more of such devices may be staged in a manner similar to the configuration of devices depicted in FIG. 2.

It will be understood that when mixed liquor 11 exhibit a low DO level and hence a maximum demand, the oxygen flow to chamber 16' through valve 32 is set to maintain an oxygen concentration of approximately 95% in gas space 25. This limit of $O_2$ concentration is established to avoid flushing undesirably large quantities of oxygen from chamber 16'. In addition, it is noted that in the exemplary embodiments of the present invention illustrated in FIGS. 1 and 2, no valves are required to pass 'contaminated' or used oxygen. Consequently, more reliable operation of such valves is assured as only 'clean' oxygen is caused to flow through control valve 32.

While the present invention has been particularly described in terms of specific embodiments thereof, it will be understood that numerous variations upon the invention are now enabled to those skilled in the art, which variations are again within the instant teaching. Accordingly, the present invention is to be broadly construed and limited only by the scope and spirit of the claims now appended hereto.

What is claimed is:

1. A method of dissolving a gas in a liquid in a generally enclosed chamber emplaceable in a body of said liquid, comprising the steps of: introducing said gas into said chamber thereby depressing liquid therein to a level corresponding to the pressure of said gas; pumping a stream of liquid into said chamber and establishing a gravitational fall of said liquid stream over a weir through said gas space whereby the resulting liquid-gas turbulence effects a mass transfer of said gas into said liquid; discharging said liquid with said gas dissolved therein through a nozzle into said body of liquid; limiting the height of said gravitational fall of said liquid by placing a tube having a lower end in said body of liquid and disposed in communication with said gas space with the lower end of said tube defining the lowest level within said chamber to which said liquid therein is depressed and thereby defining the maximum height of said gravitational fall; establishing a desired level of said gas dissolved in said liquid; sensing the actual level of gas dissolved in said liquid; and, in response to sensing an actual level of gas dissolved in said liquid above said desired level, reducing the flow of said gas to said chamber to thereby also reduce the power consumed as a consequence of pumping said liquid into said chamber against a lower head pressure resulting from reducing said gas flow into said chamber.

2. A method as defined in claim 1 wherein said gas is comprised of between 40 and 100% oxygen and said liquid is comprised of mixed liquor of a secondary stage activated sludge process.

3. A method as defined in claim 1 additionally comprising the steps of increasing the gas flow to said chamber in response to sensing an actual level of said dissolved gas below said desired level thereby depressing the level of liquid therein and increasing the height of said gravitational fall to increase the level of gas dissolved in said liquid discharged from said chamber.

4. Apparatus for dissolving a gas in a liquid comprising a generally enclosed chamber emplaceable in a body of said liquid and having a liquid inlet and outlet with a nozzle at said outlet; means for supplying said gas to said chamber such that the pressure of supplied gas is effective to depress liquid in said enclosure to a level which varies in accordance with said gas pressure; gravitational fall means including a weir and a baffle spaced from said weir to define a gravitational fall zone intermediate said inlet and outlet; pump means for pumping said liquid through said inlet and subjecting said pumped liquid to a gravitational fall over said weir into said fall zone through said gas space to effect a mass transfer of said gas into said liquid; means for discharging said liquid with gas dissolved therein through said nozzle; dip tube means at least partially disposed in said body of liquid and in communication with said gas space for limiting the maximum gas pressure in said space thereby defining a maximum height of said gravitational fall; means for sensing the concentration of gas dissolved in said body of liquid and means responsive to said sensing means for controlling the flow of said gas to said chamber in accordance with said sensed concentrations such that upon sensing a dissolved gas concentration in said body of liquid above a desired level said control means is effective to reduce said gas flow to thereby reduce the power consumed by said pump means as a consequence of pumping said liquid against a lower pressure head resulting from the reduced gas flow into said chamber.

5. Apparatus as defined in claim 4 wherein said dip tube is disposed substantially vertically in said body of liquid and may be adjustably positioned in a vertical direction.

6. Apparatus as defined in claim 5 additionally comprising means disposed about said dip tube for collecting gas emitted therefrom.

7. Apparatus as defined in claim 4 additionally comprising at least one further chamber with the gas space of each of said chambers adapted to communicate with the gas stage of a succeeding chamber and with said dip tube arranged in communication with the gas space of the last chamber.

* * * * *